United States Patent [19]

Feyer

[11] Patent Number: 4,830,076
[45] Date of Patent: May 16, 1989

[54] ADJUSTABLE PLANER EXTENSION TABLE

[76] Inventor: Gerhard Feyer, 2 Chris Pl., Colonie, N.Y. 12205

[21] Appl. No.: 199,607

[22] Filed: May 31, 1988

[51] Int. Cl.⁴ .............................................. B25H 1/00
[52] U.S. Cl. .................................. 144/287; 83/477.2; 144/286 A
[58] Field of Search .................. 144/129, 130, 286 R, 144/286 A, 287, 329; 83/486, 473, 648, 574

[56] References Cited

U.S. PATENT DOCUMENTS

| | | | |
|---|---|---|---|
| 1,104,735 | 7/1914 | Morris | 144/287 |
| 1,583,879 | 5/1926 | Hallock | 144/287 |
| 3,171,454 | 3/1965 | Boice | 144/129 |

Primary Examiner—W. Donald Bray
Attorney, Agent, or Firm—Schmeiser, Morelle & Watts

[57] ABSTRACT

A method and apparatus for automatically adjusting a bench type machine feed table extension. The traditional infeed/outfeed table for a planar, jointer or similar machine is extended and the extension automatically maintained at the height of the feed table which it serves. A feed table extension is joined at one end to the feed table and fixed at the other end, below the extension, with a wedge shaped body, so as to present a surface of the body, which is inclined to the horizontal, facing downward. A second wedge body, complimentary to the first, is moveably positioned beneath the extension so as to place its inclined face in registry with that of the first body. Translation of the lower, second wedge body along the axis of feed effects a pushing up or letting down of the first wedge body and, consequently, the feed table extension. The slidable wedge body is coupled by a translating push rod, pivotal dogleg and vertical push rod assembly to the same feed table end to which the extension is fixed. Thus, vertical movement of the feed table actuates the push rod and dogleg mechanism to translate the second incline body, raise or lower the first, and impart identical motion over the identical distance, to the extension table as is undergone by the feed table.

2 Claims, 2 Drawing Sheets

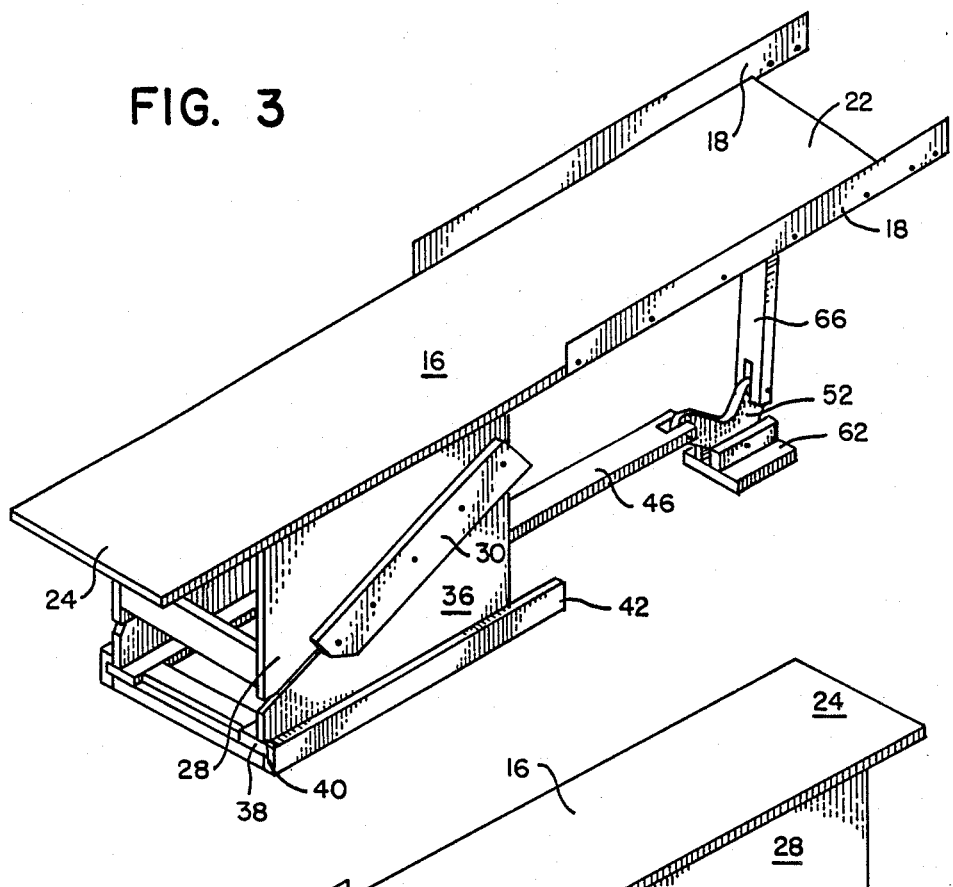

ADJUSTABLE PLANER EXTENSION TABLE

FIELD OF THE INVENTION

This invention relates to table type machines such as jointers, planers, or the like, and particularly to improvements in the means for precision adjustment of the infeed/outfeed tables for such machines.

BACKGROUND OF THE INVENTION

Various bench or table type machines such as planers, jointers, and circular saws possess adjustable infeed and outfeed tables so as to maintain a consistent reference between the cutting tool and the workpiece that is generally being fed into the material cutting or removal apparatus. Whether the cutting tool is disposed above the workpiece or below, it has long been accepted by the craftsmen using such machines that any variation in the aforementioned tool-workpiece disposition could result in the asymmetrical removal of material from the workpiece. Thus, whether the machine in use be a planer, jointer or sawing mechanism, and whether the cutting tool be disposed above or below the workpiece, relative adjustments between infeed and outfeed tables must often be made to assure a consistent, uniform presentation of the workpiece to the cutting tool.

Turning to the more specific areas of concern in the instant invention, adjustability of an infeed or outfeed extension for the table or bench type planer offers considerable promise for alleviating an onerous problem that has faced craftseen for years. Although a significant amount of art exists, drawn to adjustability of infeed and outfeed tables, there is a paucity of invention dealing with the production or use of infeed/outfeed table extensions of the variable or adjustable type. The teachings of Morris, as disclosed in U.S. Pat. No. 1,104,735, address the need for a variable or adjustable infeed table extension. The Morris disclosure shows an extension to the infeed table of a saw. That the main work platform or saw table moves to transport work into the cutting tool is of no immediate consequence; however, Morris employs the aforesaid apparatus to either present an infeed table at the height of the translating saw table or in an inoperative position, below the saw table, for ripping operations. Essentially, this infeed extension rests on rocking arms that extend from a horizontal support which is supported at the adjustable table's infeed end by a fixed, but manually adjustable, vertical stanchion. The outfeed end of the extension table is journaled to the infeed end of the saw table. The actual extension table surface is cantilevered by rocking arms from the horizontal support and further supported at its swinging edge by a vertical, two-position height adjustable leg. Height adjustability in the vertical leg is acquired through use of a hand operated knuckle joint which is caused to move between two stationary holding pins, one which will effect a shortening of the knuckle joint adjustment leg and the other which effects a lengthening of it. When the knuckle joint is manually adjusted to retract the out-rigged extension leg, the infeed extension table pivots on its rocker extension and is caused to drop below the level of the saw table. When the knuckle joint is adjusted to acquire the longer extension, the infeed extension table is raised to the height of the saw table. It is apparent to one of ordinary skill in the art that this infeed extension table could be made to serve as an outfeed extension table, as well. What is also apparent, as a drawback or disadvantage of the invention, is the lack of continuous adjustability in that it can only be positioned in one of two postures; compounding this disadvantage is the fact that the adjustment must be made manually and that the inventor really did not contemplate its use as an outfeed table extension. The Morris invention, save for its basic concept of providing an adjustable infeed or outfeed table, does not fulfill the instant inventor's need for an automatically adjustable infeed/outfeed extension.

When heavy, elongate workpieces are fed into a planer, jointer, or the like, it may be necessary to make an adjustment in the machine's working surface. Such a necessity has been cleverly dealt with in the industry as attested to in the patent issued to Boice, U.S. Pat. No. 3,171,454, in 1965. The Boice teaching provides a means for adjusting the positions of jointer cutters to achieve this, in part; the machine work table is distinctly divided between outfeed and infeed tables. The input side, or cutting side, of the outfeed table is fashioned with incline means while the output or cutting side of the infeed table is constructed with an incline surface having the compliment of the outfeed incline surface and in slidable registry therewith. By causing one of the tables, here the infeed table, to move into or away from the other, along their common longitudinal axis, the moving table either "rides up" or "rides down" the incline end of the other table, thus being raised or lowered, respectively. Although Boice does not deal with the subject of infeed or outfeed extension tables, he nevertheless employed a clever means for effecting upward and downward translation of a table and, therefore, teaches an element of the art considered relevant by the instant inventor.

An outfeed extension table and, to some degree, an infeed extension table must be maintained at a consistent height, relative the cutting tool. The longer the workpiece, and the heavier, the more this factor becomes apparent to the craftsman. For example, if a carpenter were working a long two by eight on a planer or jointer, as the workpiece passed the end of the outfeed table, its weight would begin to cause a bowing running from the edge of the outfeed table to the closest secondary fulcrum, the cutting tool. Thus, an unexpected and unwanted force would be applied to the workpiece forcing it either into or away from the cutting tool. But if an extension table were provided so that a contiguous infeed or outfeed surface is provided for the elongate workpiece, and that extension (specifically, its surface farthest from the cutting tool), is maintained at the same height as the infeed or outfeed table, the aforementioned problem would be successfully avoided.

Thus, the instant inventor sought to provide an automatically adjusting infeed/outfeed extension table for machines of the types herein mentioned. Specifically, the ends of the extension tables nearer the respective infeed/outfeed tables were to be fixed or journaled to those respective tables while the outermost ends of the extension tables would be adjustably motivated so as to remain at the precise heights of the respective infeed-/outfeed table surfaces which they served. As hereinafter disclosed and described, the instant inventor has conceived and reduced to practice a most useful invention embodying the aforesaid concepts.

SUMMARY OF THE INVENTION

Hereinafter, the preferred embodiment of the instant invention, an automatically adjusting outfeed extension, will be discussed and disclosed with the understanding that, to one of ordinary skill in the art, an outfeed extension table for a planer can readily, by the apparatus of the instant invention, serve as an infeed table extension for the planer, in addition to similar applications for the jointer, bench saw and other bench or table type machines. Indeed, the invention is readily applicable to any of the aforementioned machine types, in any size.

In the preferred embodiment, a flat, elongate table is journaled to the adjustable infeed/outfeed table of a planer, or similar machine. This is the extension table and its surface at the point of journaling must lie in the exact plane of the table to which it is journaled. The other end of the extension table is rigidly affixed to a wedge-shaped body at one side of the wedge geometry. The apex of the wedge body is aligned either facing toward the machine or away from it. Directly beneath the extension table wedge body, hereinafter referred to as the table incline, there is fixed a base that will accommodate a slidable (moveable) and similar incline body, the apex of which is disposed opposite the table incline, and positioned immediately below it. By translating the moveable incline, toward or away from the machine and coextensive the common axis passing through infeed, outfeed and outfeed extension tables, the table incline is caused to move upward or downward, carrying the extension table end, to which it is rigidly affixed, in those respective directions.

Having established the means for raising and lowering the most outward end of the extension table, the inner end having been journaled to the outfeed table, it is only necessary to couple the moveable incline means with a discrete portion of the moveable outfeed table in order to assure that the up and down translation of the extension table is gated precisely to the up and down movement of the outfeed table. To this end, the instant invention comprises a novel apparatus further comprising a vertical push rod journaled at the outfeed table and pivotally connected at the other end to a rigid dogleg (90-degree "L"), which is pivotally mounted in a rigidly fixed fulcrum; and from the dogleg there extends a translating push rod that is pivotally journaled at the end of the other dogleg portion and, at its other end, in the moveable incline. Operationally, the coupling mechanism is quite simple and yet precise. Say for example, the outfeed table moves downward, the vertical push rod is depressed and causes the "L" shaped dogleg, pivoting in its fulcrum, to draw the translating pushrod towards the machine. In so doing, the moveable incline, in this case apex facing outward and away from the machine, is pulled away from the table incline, in this case its apex disposed inward and towards the machine, causing it to "ride down" the withdrawing moveable incline and carry with it, in a precisely gated fashion, the outer end of the extension table to which the table incline is rigidly fixed. Those of ordinary skill in the art of kinematics will readily recognize that more than one incline pair may be used, depending on the necessity of providing even greater length to an extension table. Additional incline pairs may be coupled in precisely the same aforementioned manner, even to the extent of concatenating a second translating push rod with the first moveable incline.

The following detailed description of the preferred embodiment, along with the drawings and claims appended hereto, will best serve to define the invention's essential elements. Use and practical application of the invention may lead to other embodiments inculcating these basic elements; however, this preferred embodiment, with the specific elements, can be readily and relatively inexpensively manufactured.

DESCRIPTION OF THE DRAWINGS

Of the Drawings

FIG. 3 is a quartering isometric illustration of the invention, viewed facing the planer; and FIG. 4 is a quartering isometric view of the invention, facing away from the planer.

DETAILED DESCRIPTION OF THE PREFERRED EMBODIMENT

As mentioned above, the preferred embodiment of the adjustable planer outfeed extension table may be realized or mechanized to serve as an infeed or outfeed table extension for any number of bench type or table type machines. By reference to the accompanying drawings, the reader will hereinafter be apprised of only the necessary elements of the instant invention.

Figure 1:
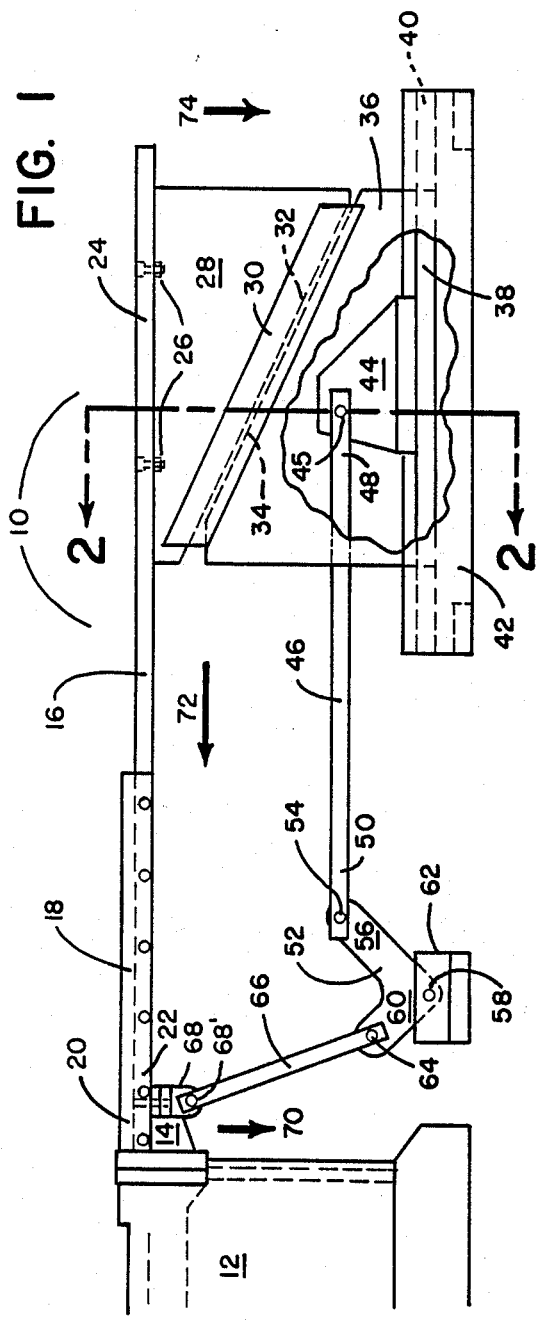
FIG. 1 is a side elevation of the functional components of the invention, with partial cut-away view.
Figure 2:
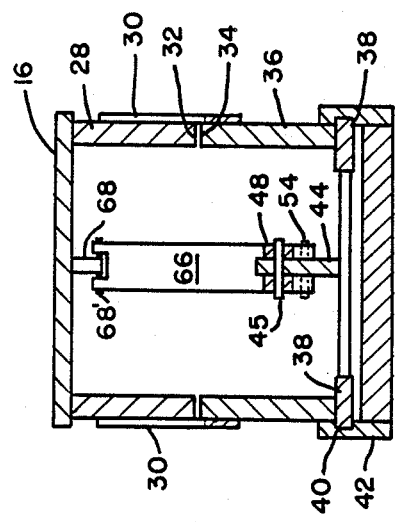
FIG. 2 is a sectionalized end view of the invention taken at 2—2 of FIG. 1, facing the planer.

Referring more particularly now to FIG. 1, there is illustrated an embodiment of the invention 10 that has performed successfully for the inventor, producing excellent results in the planing of finished lumber. At the left side of the figure there is illustrated a bench planer 12 with a height-adjustable outfeed table 14. An outfeed table extension platform 16 is rigidly affixed to the outfeed table 14 by guidebars 18 (on each side of the extension and outfeed tables). A variation of this preferred embodiment entertains the concept of journaling the extension table 16 to the outfeed table 14 at their interface point 20; but, for the sake of expedience, the instant inventor has chosen to inculcate two characteristics in this embodiment by use of the paired flat irons 18—ready fixation of end 22 to the outfeed table 14 and a means for guiding workpieces as they exit the outfeed table onto the extension table 16. The outside end 24 of extension table 16 has bolted 26 to its base a wedge shaped body 28 which, for the purposes best suited to the instant inventor, comprises an asymmetrical hexahedron (or pentahedron). Along the lateral edges of the inclined portion are guide flanges 30 which assure that the table incline 28 presents its incline face 32 in moveable registry with face 34 of moveable incline 36. The only motion entertainable of incline 26, relative to incline 36, is the translation of incline faces 3 and 34 over one another, coextensive to the axis about feed table 14 and extension table 16. No side-to-side motion is allowed between the inclines. The base of moveable incline 36 has flanges 38 extending from each side thereof which are captured in the grooves 40 of base platform 42. Again, this is an expedient for rendering the moveable incline 36 translatable in but a single plane. Those of ordinary skill will readily recognize that other suitable mean for allowing moveable incline 36 to translate across the common plane of tables 14 and 16 can readily be had. Likewise, triangular fulcrum 44 is an expedient for the pivotal mounting of translating push rod 46 in moveable incline 36. The essential characteristic sought to be inculcated with the instant device is to provide a firm fixation of incline end 48 of translating push rod 46 while allowing it to pivot freely. Conceivably, ball-in-socket means could be readily employed in this instance. Between base 42 and planer 12 there is situate a fulcrum 62. Pivot 58 transfixes "L" shaped dogleg knuckle 52, which is a rigid 90 degree element of the invention. The dogleg is comprised of a leg 56 which is journaled to the translating push rod's 46 remaining free end 50 by pivot 54. Orthogonal to leg 56 is the shorter leg 60 which is pivotally mounted 64 to vertical push rod 66. The entire dogleg apparatus is pivotally mounted on fulcrum 62 and pivot 58 at the intersection of the axis of legs 56 and 60 of dogleg 52. Finally, completing the coupling of the moveable incline to the adjustable outfeed table 14 is thrust bearing 68, which is rigidly affixed to the outfeed table. For ease of construction, simplicity and cost effectiveness the instant inventor has chosen to use conventional bolt-in-hole pivots at 68', 64, 58, 54 and for connecting 45 translating end 48 to moveable incline fulcrum 44. As pointed out above, other means for obtaining pivotal rotation with thrust bearing characteristics may be contemplated by those of ordinary skill. When placed in operation, the motion of the outfeed table 14 in the direction indicated by broad arrow 70 will result in a counter clockwise rotation of dogleg arm 56 about pivot 58. This will induce movement of translating push rod 46 in the direction indicated by arrow 72, carrying with it, in the same direction, moveable incline 36. The weight of extension table 16 and table incline 28 will cause the incline to move down the interface 32-34, constrained from sideways motion by guide flanges 32. Thus, incline end 24 of extension table 16 will drop identically with the descent of outfeed table 14 and in the direction emphasized by arrow 74. If outfeed table 14 is raised, the reverse of the aforesaid process will take place and table incline 28 will be pressed upward by the intrusion thereunder of moveable incline 36. Since the instant inventor prefers to construct at least the inclines of wood, the only lubricant necessarily placed on the contacting faces 32 and 34 is an ordinary wax. This suits the inventor's purpose well since mostly finished lumber is planed during the construction of fine cabinets (and wood working) and ordinary wood wax is the least noxious of available lubricants The section of FIG. 1 at 2—2, looking toward planer 12, is illustrated in FIG. 2. From this end view sectional, meant to show only the interacting incline apparatus, the reader may note how extension table 16, rigidly affixed to table incline 28, is allowed to move over movable incline 36, constrained from any side-to-side motion by side flanges 30. Also clearly depicted herein is the base platform 42 bearing horizontal grooves 40 at each of it sides; grooves 40 receptive of movable incline 36 side flanges 38. Prominent in the lower half of FIG. 2 is the incline's fulcrum 44 which is receptive of the push rod's 46 yolk end 48. Here again, the apparatus disclosed as 44, 48 may be substituted with any other pivotal, thrust bearing arrangement say, for example, a ball-in-socket arrangement with the ball substituted for fulcrum 44 and the socket, of the ordinary trailer hitch type, substituted for yolk 48. Those of ordinary skill, and familiar with such mechanistic and kinematic art, are undoubtedly aware of numerous other mechanisms which could realize the basic kinematic concept of the instant invention.

As noted above, the instant inventor has chosen wood as the construction medium for his actual reduction to practice. FIGS. 3 and 4 are isometric views of the invention attached to a planer, viewed looking toward the planer and away from it, respectively Like the machine 12, dogleg fulcrum 62 is bolted to the shop floor, as is movable incline base 42. The means for coupling movement of the planer outfeed table 14 to the incline mechanism 28, 36 is, herein, one of push rods and levers. As stated earlier, the selection of this type of apparatus was an expedient. Other means of positive coupling may be readily employed such as the ratcheting of a rotatable sprocket wheel to move the incline 36 by a chain drive or, if desired, the substitution of a master-slave hydraulic apparatus. Since the planer end of the extension table 22 is firmly affixed the outfeed table 14, only its opposite end 24 need be gated to the vertical motion of the outfeed table. Thus, the nexus of the invention is the method and apparatus employed for gating the movement of the extension table's 16 extremity 24 to the vertical motion of outfeed table 14.

Familiarization and utilization of the invention will allow the user to develop other modes of implementation. Application of the principles of the invention and deviation from the specific embodiments herein shown may be had within the scope of the appended claims without departing from the aforesaid principles.

What is claimed is:

1. An automatically adjusting feed table extension for use with a bench type machine comprising:
   an elongate planer extension table fixed at a first end to the feed table of a planer, jointer or similar machine and fixed proximate its second end to vertical movement means, said extension being coextensive the fixed work-feed axis of such machine;
   vertical movement means fixed proximate said extension table second end and adapted to move with said second end, vertically;
   and coupled translation means comprising an essentially vertical push rod journaled to said feed table; a rigid pivotable dogleg member into which is journaled the second end of said vertical push rod at a first end of said dogleg, to translate the motion of said vertical push rod into rotary motion about a fulcrum in which said dogleg is pivotally mounted; and a translating rod pivotally mounted at one end to the rotary motion-effecting end of said dogleg and at the other end pivotally journaled in said vertical movement means to couple and translate the vertical motion of said feed table to an orthogonal translational movement for employment by said vertical movement means, said translation means to translate vertical movement of said feed table to said vertical movement means and thence to said second end of said extension, whereby the vertical motion of said feed table and fixed first extension end is transferred through said coupled translation means to said vertical movement means to effect motion of said extension second end that is identical to said feed table motion.

2. The invention of claim 1, wherein said vertical movement means comprises a slidable wedge shaped body fixed to said extension so that its nonfixed incline side faces away from said extension and further a second wedged shaped body having slide means attached thereto so as to allow said second wedge body to slidably move along an axis coextensive said extension while maintaining one of its incline faces in slidable registry with the incline face of said first wedge body.

* * * * *